United States Patent [19]

Kawakami et al.

[11] Patent Number: 4,966,933

[45] Date of Patent: Oct. 30, 1990

[54] PROPYLENE POLYMER FILM

[75] Inventors: Ken-ichi Kawakami, Abiko; Masatsugi Murakami, Moriyama; Kenji Takuwa, Takatsuki, all of Japan

[73] Assignee: Toray Industries, Inc., Tokyo, Japan

[21] Appl. No.: 279,707

[22] Filed: Dec. 5, 1988

[30] Foreign Application Priority Data

Aug. 2, 1988 [JP] Japan .................. 63-194011

[51] Int. Cl.$^5$ .................. C08K 5/10; B32B 27/32
[52] U.S. Cl. .................. 524/310; 524/320; 524/506; 428/331; 428/216; 428/447; 428/448; 428/461; 428/516; 428/518; 428/910; 428/509; 428/35.9; 428/36.7; 427/40; 427/41; 264/176.1
[58] Field of Search ............... 428/331, 447, 448, 461, 428/516, 216; 524/506, 320, 310

[56] References Cited

U.S. PATENT DOCUMENTS 4,230,767 10/1980 Isaka et al. .................. 428/516
4,725,466 2/1988 Crass et al. .................. 428/516

*Primary Examiner*—P. C. Sluby
*Attorney, Agent, or Firm*—Birch, Stewart, Kolasch & Birch

[57] ABSTRACT

A propylene polymer film is described which is composed of a composition including 100 parts by weight of a propylene polymer, 0.01 to 0.5 parts by weight of a fine powder of a crosslinked silicone resin and 0.3 to 3.0 parts by weight of a hydroxy-fatty acid glyceride. A laminate film including a layer comprised of the above composition is also described. The film has an excellent transparency, gloss, slipperiness and adhesiveness, as well as a good adaptability to vacuum deposition.

26 Claims, No Drawings

PROPYLENE POLYMER FILM

BACKGROUND OF THE INVENTION

1. Field of the Invention

This invention relates to a propylene polymer film having an excellent transparency, gloss, slipperiness, adhesiveness and adaptability to vacuum deposition, which is suitable for use as packaging material after vacuum deposition.

2. Description of the Related Art

As means for improving the transparency, slipperiness and blocking resistance of a propylene polymer film, a process (1) is known in which a non-melting silicone resin powder is incorporated is a propylene polymer (see for example, Japanese Unexamined Patent Examination No. 62-215646, Japanese Unexamined Patent Publication No. 62-232448 and Japanese Unexamined Patent Publication No. 62-233248). As means for improving transparency of a propylene polymer film, a process (2) is known in which an acylated fatty acid glyceride is incorporated in a propylene polymer (see, for example, Japanese Examined Patent Publication No. 60-57459, Japanese Unexamined Patent Publication No. 53-54248 and Japanese Unexamined Patent Publication No. 54-36359). As means for improving slipperiness and transparency of a propylene polymer film, the present inventors proposed a process (3) in which a specific thermosetting resin such as a silicone resin is incorporated in a propylene polymer (see Japanese Unexamined Patent Publication No. 62-294526). Moreover, as a method for improving slipperiness of a propylene polymer film, a process (4) is known in which an organic fatty acid amide such as oleic acid amide, stearic acid, amide or erucic acid amide is incorporated in a propylene polymer, and a process (5) is known in which particles of an inorganic substance such as silica, talc or calcium carbonate are incorporated in a propylene polymer.

The above-mentioned conventional propylene polymer films have the following problems.

The films obtained by the process (1) and (3) have a good transparency and slipperiness, but during the operation conducted after vacuum deposition, defects or discharge traces are formed on the vacuum deposition layer by the discharge treatment, or small pinholes are formed or blocking is caused, resulting in peeling or wrinkling of the vacuum deposition layer. Namely, these films have an insufficient adaptability to vacuum deposition.

The film obtained by the process (2) has a good transparency, but the gloss and adhesiveness are unsatisfactory.

The film obtained according to the process (4) has a good transparency but the slipperiness is unsatisfactory.

The process obtained by the process (5) has an improved slipperiness, but the transparency is unsatisfactory.

SUMMARY OF THE INVENTION

Therefore, an object of the present invention is to solve the foregoing problems and provide a propylene polymer film having an excellent transparency, gloss, slipperiness adhesiveness, and adaptability to vacuum deposition.

In accordance with the present invention, there is provided a propylene polymer film comprised of 100 parts by weight of a propylene polymer, 0.01 to 0.5 part by weight of a fine powder of a crosslinked silicone resin and 0.3 to 3.0 parts by weight of a hydroxy-fatty acid glyceride.

Furthermore, in accordance with the present invention, there is provided a laminate film including a layer comprised of the above-mentioned composition.

DESCRIPTION OF THE PREFERRED EMBODIMENTS

As the propylene polymer used in the present invention, there can be mentioned a propylene homopolymer, a random, block or graft copolymer of propylene with other α-olefin such as ethylene, butene, 4-methylpentene or octene, an unsaturated carboxylic acid or its derivative such as acrylic acid or maleic anhydride, and a mixture thereof. Preferably the isotactic index (II) of the propylene polymer is at least 50, especially at least 80. For a propylene homopolymer, it is especially preferred that II is at least 95% and the intrinsic viscosity $[\eta]$ is 1.2 to 2.5 dl/g. As preferred examples of the propylene polymer, there can be mentioned an ethylene/propylene copolymer having an ethylene content of 1 to 8% by weight, an ethylene/propylene/butene-1 copolymer having an ethylene content of 0.5 to 5% by weight and a butene-1 content of 3 to 25% by weight, a propylene/butene-1 copolymer having a butene-1 content of 3 to 25% by weight, and a mixture of an ethylene/propylene copolymer and a propylene/butene-1 copolymer, having an ethylene content of 0.5 to 5% by weight and a butene-1 content of 2 to 15% by weight. For a copolymer, preferably the propylene content is at least 80% by weight. For a copolymer mixture, it is not absolutely necessary that the propylene content should be at least 80% by weight in all of the copolymers, but preferably the propylene content in the entire mixture is at least 80% by weight.

The fine powder of the crosslinked silicone resin is a powdery product having a three-dimensional crosslinked structure, which is obtained by hydrolyzing and condensing a trifunctional silane such as a methyltrialkoxysilane or phenyltrialkoxysilane in which the carbon number of each alkoxy group is 1 to 4. This crosslinked product is obtained by a process disclosed, for example, in Japanese Unexamined Patent Publication No. 60-13813 or Japanese Unexamined Patent Publication No. 63-77940. Polymethylsilsesquioxane is especially preferred. The fine powder of the crosslinked silicone resin may have any of a spherical shape, a flat shape, a tufty shape and an indeterminate shape. The fine powder may have one of these shapes or two or more thereof in combination.

The hydroxy-fatty acid glyceride is a hydroxylated product of a mono-, di- or tri-glyceride of a fatty acid having 8 to 22 carbon atoms. For example, a product obtained by hydrogenation of natural castor oil is included in the hydroxy-fatty acid glyceride. A preferable hydroxy-fatty acid glyceride is the one in which the hydrogen atom bonded to the 12th carbon atom counted from the carbon atom of the carbonyl is substituted by OH. The glyceride is preferably a triglyceride. Glyceryl tri-12-hydroxystearate is most preferred as the hydroxy-fatty acid glyceride.

In the present invention, both the fine powder of the crosslinked silicone resin and the hydroxy-fatty acid glyceride must be incorporated in the specific amounts. More specifically, the fine powder of the crosslinked silicone resin is incorporated in an amount of 0.01 to 0.5 parts by weight, preferably 0.02 to 0.35 parts by weight, per 100 parts by weight of the propylene polymer, and the hydroxy-fatty acid glyceride is incorporated in an amount of 0.3 to 5.0 parts by weight, preferably 0.5 to 3.0 parts by weight, per 100 parts by weight of the propylene polymer. If the amount of the fine powder of the crosslinked silicone resin is smaller than 0.01 part by weight, the slipperiness and adaptability to vacuum deposition are not satisfactory, and if the amount of the fine powder of the crosslinked silicone resin is larger than 0.5 part by weight, the transparency, gloss and adaptability to vacuum deposition are not satisfactory. If the amount of the hydroxy-fatty acid glyceride is smaller than 0.3 part by weight, the slipperiness and adaptability to vacuum deposition are not satisfactory, and if the amount of the hydroxy-fatty acid glyceride is larger than 5 parts by weight, the adhesiveness, gloss, and adaptability to vacuum deposition are not satisfactory.

The propylene polymer film of the present invention is obtained by shaping the above-mentioned composition, and the film may be any of an undrawn film, a uniaxially drawn film, a biaxially drawn film, a cast film, a roll-drawn film, a tubular biaxially drawn film, a tenter biaxially drawn film, a single-layer film and a laminate film. A laminate film is preferred because various characteristics can be imparted.

In the case of the laminate film, the thickness of the laminated layer is 0.5 to 20 μm, preferably 1 to 10 μm, and the thickness of the base layer is 5 to 50 μm, preferably 10 to 20 μm. As the lamination method, there can be mentioned a co-extrusion method, a method in which lamination is effected on a uniaxial drawn film, and a method in which biaxially drawn films are bonded. A two-layer structure of laminated layer/base layer and a three-layer structure of laminated layer/base layer/laminated layer are preferred as the laminate structure. Preferably, a layer [layer (A)] comprising both the fine powder of the crosslinked silicone resin and the hydroxy-fatty acid glyceride is at least one of the base layer and the laminated layer. Most preferably, the laminate film is a two-layer film comprising the layer (A) as the laminated layer and the other layer [layer (B)] as the base layer, which is composed of 100 parts by weight of a propylene polymer and 0.005 to 0.2 parts by weight of a fine powder of a crosslinked silicone resin.

To obtain a satisfactory transparency, gloss, slipperiness and adhesiveness, preferably the average particle diameter of the fine powder of the crosslinked silicone resin is 1.0 to 10.0 μm. For the abovementioned two-layer film, it is especially preferable that the average particle diameter $d_A$ of the fine powder of the crosslinked silicone resin in the layer (A) and the particle diameter $d_B$ of the fine powder of the crosslinked silicone resin in the layer (B) satisfy the requirements of $d_A \geq d_B$, $1.0 \ \mu m \leq d_A \leq 10.0 \ \mu m$ and $0.5 \ \mu m \leq d_B \leq 5.0 \ \mu m$.

For the two-layer film preferably the atomic construction ratio within 10 nm thickness of the outer surface layer on the side of the layer (B) is such that the oxygen atom number/carbon atom number ratio is in the range of from 0.10 to 0.35 and the nitrogen atom number/carbon atom number ratio is in the range of from 0.005 to 0.05, because the adhesiveness is improved when vacuum deposition of a metal or printing is effected on the surface of the layer (B) of the two-layer film.

A co-extruded biaxially drawn two-layer film comprising a laminated layer [layer (A)] comprising an ethylene/propylene copolymer, a propylene/butene-1 copolymer, a mixture of both the copolymers or an ethylene/propylene/butene-1 copolymer, and incorporated therein a fine powder of a crosslinked silicone resin and a hydroxy-fatty acid glyceride, and a base layer [layer (B)] comprising a propylene homopolymer, that is, isotactic polypropylene, incorporated therein a fine powder of a crosslinked silicone resin, and having a vacuum deposition layer of a metal such as aluminum, zinc or an alloy having a thickness of 10 to 500 nm, namely, an optical density of 0.5 to 5.0 formed on the surface of the base layer, is most preferred as the film construction in the present invention. In this structure, the laminated layer side has a good heat sealability and the vacuum-deposited metal layer on the base layer side is effective for bonding and printing, and this structure is valuable for use as an oxygen- or moisture-barrier film and as a vacuum-deposited packaging film having an excellent appearance vacuum-deposited printing.

Note, inorganic particles of silica, calcium carbonate and sodium aluminosilicate (zeolite); organic substances such as oleic amide, stearic amide, erucic amide, stearic monoglyceride, stearic triglyceride, hydroxy-fatty acid amines, sodium salts of amino-fatty acids, betaine compounds and N,N,-bis-hydroxyethylalkylamines, and known nucleating agents; slip agents, antistatic agents, antioxidants, heat stabilizers, ultraviolet screeners and ultraviolet absorbers can be incorporated in the composition constituting the propylene polymer film of the present invention in amounts not hindering the attainment of the objects of the present invention, generally in amounts smaller than 1% by weight, preferably in amounts smaller than 0.6% by weight. Silica, oleic acid amide, stearic acid amide, erucic acid amide and stearic acid monoglyceride are especially preferred as agents for minutely adjusting the slipperiness of the film of the present invention.

An example of the process for preparing the propylene polymer film of the present invention will now be described, although the process that can be adopted in the present invention is not limited to the process described below.

First, a composition comprising a propylene polymer and necessary additives is supplied to one extruder, (or at least two extruders in the case of co-extrusion lamination), and the composition is melt-extruded at 200 to 300° C. and the extrudate is wound on a cooling drum at 20 to 100° C. to form a sheet. When the film is used in the form of an undrawn or cast film, the film obtained at this stage is used. Then, the sheet is guided to rolls and drawn in the longitudinal direction at a draw ratio of 3 to 7 under heating at 100 to 150° C. When the film is used in the form of a uniaxially drawn film or roll-drawn film, the film obtained at this stage is used. The uniaxially drawn film is guided to a tenter in an atmosphere maintained at 150 to 185° C. and drawn in the lateral direction at a draw ratio of 5 to 15, and if necessary, the drawn film is relaxed and thermally set in an atmosphere maintained at 140 to 170° C. When the film is used in the form of a tenter-biaxially drawn film, the film obtained at this stage is used.

Furthermore, there can be adopted a process in which a composition is melt-extruded from another extruder onto the surface of the uniaxially drawn film to form a laminate film.

In view of the point described below, preferably a corona discharge treatment is conducted on one surface of the so-obtained biaxially drawn film or the surface of the base layer for a co-extruded two-layer film. When printing or vacuum deposition of a metal is effected on the treated surface, the adhesion to printing or vacuum deposition is advantageously improved. The corona discharge treatment may be carried out in air, but preferably the corona discharge treatment is carried out in an atmosphere composed mainly of carbon dioxide gas.

The vacuum deposition process is not particularly limited, and a batchwise vacuum deposition process and an air/air continuous vacuum deposition process can be adopted, and such means as electric heating, ion beaming, sputtering and ion plating used.

The propylene polymer film of the present invention is usually used for packaging and is especially preferable for vacuum deposition packaging. Where a polymer having a low melting point is used as the propylene polymer of the laminated layer, this layer can act as a heat-sealable layer. The propylene polymer film of the present invention is applied where a vinylidene chloride resin is coated on the corona discharge-treated surface or a printing ink is applied to the corona discharge-treated surface, where a polyolefin is extrusion-laminated, or where another substrate, for example, an undrawn or uniaxially or biaxially drawn polyethylene, polypropylene, nylon or polyester film having a thickness of about 3 to about 50 μm, a cellophane sheet or a vinylidene chloride resin-coated cellophane sheet is bonded to the propylene polymer film. Most preferably, the vacuum deposition is effected on the propylene polymer film of the present invention and the vacuum-deposited film used as a heat-sealable package for which moisture-barrier and oxygen-barrier effects and an excellent appearance are required, for example, a package for a snack or the like.

The methods adopted for measuring the characteristic values and evaluating the effects in the present invention will now be described.

(1) Haze (transparency)

The haze determined according to JIS K-6714. A smaller value indicates a higher transparency.

(2) Gloss (luster)

The gloss was determined at 60° 60° according to JIS K-8471. A larger value indicates a better gloss.

(3) Friction coefficient (slipperiness)

According to ASTM D-1894, the static friction coefficient $\mu_s$ and the dynamic friction coefficient $\mu_d$ were determined. A smaller value indicates a better slipperiness.

(4) Aluminum vacuum deposition adhesion index (adhesive force)

Aluminum was vacuum-deposited in a thickness corresponding to an optical density of 2.0 on the corona discharge-treated surface of the film, and the vacuum deposition layer was peeled by using an adhesive cellophane tape ("Celotape" supplied by Nichiban K.K.) and the area of the aluminum-adhering portion left in the film was determined by an image treatment. The adhesion index was judged by the following standard.

| Aluminum-Adhering Area | Adhesion Index |
|---|---|
| At least 95% | 5 |
| At least 90% but less than 95% | 4 |
| At least 75% but less than 90% | 3 |
| At least 50% but less than 75% | 2 |
| Less than 50% | 1 |

A higher adhesion index indicates a better adhesive force.

(5) Adaptability to vacuum deposition

Aluminum was vacuum-deposited in a thickness corresponding to an optical density of 2.0 at a rate of m/min on the corona discharge-treated surface of a film having a width of 1 m and a length of 10,000 m, and the film was wound back at a rate of 300 m/min. Then, the film was rewound at a rate of 20 m/min and the following defects on the vacuum-deposited surface were checked under a fluorescent lamp.

(a) Defects in the vacuum deposition layer by discharge (b) Discharge traces (c) Pinholes (d) Defects in the vacuum deposition layer by blocking (e) Wrinkles The adaptability to vacuum deposition was evaluated by the following scale.

Good: none of the above defects over a length of 10,000 m

Poor: one or more of the above defects over a length of 10,000 m

Of course, mark "Good" indicates a better adaptability to vacuum deposition. (6) Average particle diameter d The average particle diameter is a value as calculated as the equivalent sphere. The particulate powder or the particulate portion of the film was observed by an electron microscope (Model S-510 supplied by Hitachi) and photographed. The image analyzing treatment was conducted on 100 particles in the photograph (Quam timet 720 supplied by Image Analyzing Computer, Inc.) and the average particle diameter was determined.

(7) Amount incorporated

The amount incorporated is the same as the amount added, but the amount incorporated in the film was measured in the following manner.

(A) The absorbances of the Si-methyl bond and

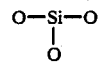

bond were measured by a Fourier transformation infrared absorption spectroscopy (Model FT-IR-FTS-50 supplied by Digilab Co.), and the amount of the fine powder of the crosslinked silicone resin incorporated in the film was determined from these absorbance.

(B) The amount incorporated of the hydroxyfatty acid glyceride in the film was determined in the following manner. First, the film was subjected so Soxhlet reflux extraction with chloroform and the extract was fractionated by a liquid chromatography (Model LC-08 supplied by Nippon Bunseki Kogyo), the absorbance was measured by a Fourier transformation infrared absorption spectroscopy (Model FT-IR-FTS-50 supplied by Digilab Co.), and the amount incorporated was determined from the absorbance.

(8) Atomic construction ratio

With respect to the treated surface of the film, the ESCA measurement of the 1s orbid was carried out by using $MgK_{\alpha1,2}$ ray as the exciting X-ray at a photoelectron emission angle of 90° while adjusting the binding energy of $C_{1s}$ main peak to 284.6 eV in ESCA Model 750 supplied by Shimadzu Corp., and the oxygen atom number/carbon atom number (O/C) ratio and the nitrogen atom number/carbon atom number (N/C) ratio were calculated.

The present invention will now be described in detail with reference to the following examples.

EXAMPLE 1

A propylene homopolymer (II =97%, [η] =2.5) containing a fine powder of a crosslinked silicone resin (polymethylsilsesquioxane, Tospearl 120 supplied by Toshiba Silicone; average particle diameter: 2 μm) and a hydroxy-fatty acid glyceride (glyceryl tri-12-hydroxystearate, Rikemal TG-12 supplied by Riken Vitamin K.K.) incorporated in the amounts shown in Table 1 was supplied to one extruder and melt-extruded at 280° C., and the extrudate was cast-wound on a cooling drum maintained at 40° C. to form an undrawn sheet. The undrawn sheet was guided to rolls and drawn at a draw ratio of 5 in the longitudinal direction under heating at 140° C. The drawn sheet was guided to a tenter and drawn at a draw ratio of 9 in the lateral direction in an atmosphere maintained at 160° C., and thermal setting was carried out at 150° C. to obtain a biaxially drawn single-layer polypropylene film having a thickness of 20 μm. One surface of the film was subjected to the corona discharge treatment in an atmosphere composed mainly of carbon dioxide gas to form an activated surface having a surface tension of 42 dyne/cm as determined by the method of JIS K-6768. Then, aluminum was vacuum-deposited in a thickness corresponding to an optical density of 2.0 on the activated surface under vacuum.

Comparative Examples 1 and 2

The procedures of Example 1 were repeated in the same manner except that the amounts of the additives incorporated were changed as shown in Table 1.

Comparative examples 1 and 2

A propylene homopolymer (the same as used in Example 1) containing 0.05 part by weight of sodium aluminosilicate (zeolite, Silton P supplied by Mizusawa Kagaku; average particle diameter: 3.5 μm) was supplied to one extruder [base layer; layer (B)], and an ethylene/propylene/butene-1 copolymer having an ethylene content of 3.5% and a butene-1 content of 5%, and containing a fine powder of a crosslinked silicone resin (polymethylsilsesquioxane, Tospearl 145 supplied by Toshiba Silicone; average particle diameter: 4.5 μm), a hydroxy-fatty acid glyceride (glyceryl tri-12-hydroxystearate), silica (Syloid 244 supplied by Fuji-Devison) and oleic amide incorporated in the amounts shown in Table 1 were supplied to another extruder [laminated layer; layer (A)], and both compositions were co-extruded at 280° C. The extrudate was biaxially drawn in the same manner as described in Example 1 to obtain an A/B two-layer laminate film (A: ethylene/propylene/butene-1 copolymer layer, B: propylene homopolymer layer). The total film thickness was 20 μm, and the thickness of the laminated layer [layer (A)] and the thickness of the base layer [layer (B)] were 3.5 μm and 16.5 μm, respectively. The surface of the layer (B) was subjected to the corona discharge treatment in the same manner as described in Example 1 to form an activated surface having a surface tension of 42 dyne/cm, and aluminum was vacuum-deposited on the treated surface in the same manner as in Example 1.

EXAMPLE 3

A propylene homopolymer (the same as in Example 1) containing 0.02 part by weight of a fine powder of a crosslinked silicone resin (polymethylsilsesquioxane, Tospearl 120 supplied by Toshiba Silicone; average particle diameter: 2 μm) was supplied to one extruder [layer (B)] and an ethylene/propylene/butene-1 copolymer (the same as in Example 2) containing a fine powder of a crosslinked silicone resin (polymethylsilsesquioxane, Tospearl 145 supplied by Toshiba Silicone; average particle diameter: 4.5 μm), a hydroxy-fatty acid glyceride (glyceryl tri-12-hydroxystearate) and silica (Syloid 244 supplied by Fuji-Devison) incorporated in the amounts shown in Table 1 were supplied to another extruder [layer (A)]. Co-extrusion, casting and biaxial drawing were carried out in the same manner as described in Example 2 to obtain a two-layer film comprising a laminated layer [layer (A)] having a thickness of 3.5 μm and a base layer [layer (B)] having a thickness of 14 μm. The surface on the side of the layer (B) was subjected to the corona discharge treatment in the same manner as described in Example 1 to form an activated surface having a surface tension of 42 dyne/cm. Aluminum was vacuum-deposited on the treated surface in the same manner as described in Example 1.

Comparative Example 3

The procedures of Example 3 were repeated in the same manner except that the amount of the hydroxy-fatty acid glyceride (glyceryl tri-12-hydroxystearate) incorporated in the composition of the laminated layer was reduced to 0.1 part by weight.

Comparative Example 4

The procedures of Example 3 were repeated in the same manner except that 0.50 part by weight of oleic amide was used instead of the fine powder of the crosslinked silicone resin and hydroxy-fatty acid glyceride used in Example 3.

The results of the measurement and evaluation of the characteristics of the films obtained in the foregoing examples and comparative examples are summarized in Table 1.

As apparent from the results shown in Table 1, the films of the present invention obtained in Examples 1, 2, and 3 had, simultaneously, a small haze, a high gloss, a low friction coefficient, and a high aluminum vacuum deposition adhesion index. Therefore, these films had a sufficient transparency, gloss, slipperiness and adhesiveness, and the adaptability to vacuum deposition is good.

In contrast, in the film obtained in Comparative Example 1, the amounts of the fine powder of the crosslinked silicone resin and the hydroxy-fatty acid glyceride were too small, and the slipperiness was poor and the adaptability to vacuum deposition was bad.

In the film obtained in Comparative Example 2, the amounts of the fine powder of the crosslinked silicone resin and the hydroxy-fatty acid glyceride were too large, and the transparency, gloss, and adhesion were poor and the adaptability to vacuum deposition was bad.

In the film obtained in Comparative Example 3, although the amount of the fine powder of the crosslinked silicone resin incorporated was within the range specified in the present invention, the amount of the hydroxy-fatty acid glyceride incorporated was too small, and therefore, the slipperiness was relatively poor and the adaptability to vacuum deposition was bad because pinholes and discharge defects of vacuum-deposited aluminum were formed.

In the film of Comparative Example 4, the additives of the present invention, that is, the fine powder of the crosslinked silicone resin and the hydroxy-fatty acid glyceride, were not incorporated in the composition of the laminated layer but silica and oleic acid amide were incorporated instead. Therefore, the film had a poor transparency, gloss and slipperiness and both of the adhesiveness and adaptability to vacuum deposition were bad.

Comparative Examples 5 and 6

The procedures of Example 1 were repeated in the same manner except that the fine powder of the crosslinked silicone resin was not incorporated (in Comparative Example 5) or the hydroxy-fatty acid glyceride was not incorporated (in Comparative Example 6). The results are shown in Table 1.

As apparent from the results shown in Table 1, in the film obtained in Comparative Example 5, the fine powder of the crosslinked silicone resin was not incorporated; and therefore, the slipperiness was poor and the adaptability to vacuum deposition was bad.

In the film obtained in Comparative Example 6, the slipperiness was poor and the adaptability to vacuum deposition was bad because the hydroxy-fatty acid glyceride was not incorporated.

Comparative Examples 7 and 8

The procedures of Example 3 were repeated in the same manner except that the fine powder of the crosslinked silicone resin (in Comparative Example 7) or the hydroxy-fatty acid glyceride (in Comparative Example 8) was not incorporated in the composition of the laminated layer. The results are shown in Table 1.

As apparent from the results shown in Table 1, in the film obtained in Comparative Example 7, the slipperiness was poor and the adaptability to vacuum deposition was bad because the fine powder of the crosslinked silicone resin was not incorporated, and in the film obtained in Comparative Example 8, the slipperiness was poor and the adaptability to vacuum deposition was bad because the hydroxy-fatty acid glyceride was not incorporated.

TABLE 1

| Examples and Comparative Examples | Construction of film and composition thereof Laminated layer [layer (A)] | Base layer [layer (B)] | Atomic construction ratio in surface portion of layer (B) O/C | N/C | Haze (%) | Gloss (%) | Friction coefficient static/dynamic | Al vacuum deposition adhesion index | Adaptability to vacuum deposition |
|---|---|---|---|---|---|---|---|---|---|
| Ex. 1 | — | Polypropylene a. (2 μm, 0.1 part by wt.) b. (0.5 part by wt.) | 0.13 | 0.01 | 2.2 | 133 | 0.45/0.35 | 5 | Good |
| Comp. Ex. 1 | — | Polypropylene a. (2 μm, 0.005 part by wt.) b. (0.2 part by wt.) | 0.14 | 0.01 | 2.1 | 135 | 0.95/0.85 | 5 | Poor |
| Comp. Ex. 2 | — | Polypropylene a. (2 μm, 0.7 part by wt.) b. (5.5 parts by wt.) | 0.15 | 0.01 | 4.5 | 125 | 0.43/0.37 | 2 | Poor |
| Ex. 2 | Ethylene-propylene-butene-1 copolymer a. (4.5 μm, 0.25 part by wt.) b. (1.5 parts by wt.) c. (Silica, 0.35 part by wt.) c. (Oleic amide, 0.1 part by wt.) | Polypropylene c. (Zeolite, 0.05 part by wt.) | 0.13 | 0.01 | 2.3 | 131 | 0.35/0.23 | 5 | Good |
| Ex. 3 | Ethylene-propylene-butene-1 copolymer a. (4.5 μm, 0.25 part by wt.) b. (0.5 part by wt.) c. (Silica, 0.35 part by wt.) | Polypropylene a. (2 μm, 0.02 part by wt.) | 0.13 | 0.01 | 2.0 | 137 | 0.38/0.25 | 5 | Good |
| Comp. Ex. 3 | Ethylene-propylene-butene-1 copolymer a. (4.5 μm, 0.25 part by wt.) b. (0.1 part by wt.) c. (Silica, 0.35 part by wt.) | Polypropylene a. (2 μm, 0.02 part by wt.) | 0.13 | 0.01 | 2.2 | 135 | 0.71/0.60 | 5 | Poor |
| Comp. Ex. 4 | Ethylene-propylene-butene-1 copolymer c. (Silica, 0.35 part by wt.) c. (Oleic amide, 0.5 part by wt.) | Polypropylene a. (2 μm, 0.02 part by wt.) | 0.14 | 0.02 | 3.2 | 122 | 0.78/0.69 | 3 | Poor |
| Comp. Ex. 5 | — | Polypropylene b. (0.5 part by wt.) | 0.14 | 0.01 | 2.0 | 136 | 1.03/0.88 | 5 | Poor |
| Comp. Ex. 6 | — | Polypropylene a. (2 μm, 0.1 part by wt.) | 0.13 | 0.01 | 2.2 | 134 | 1.01/0.77 | 5 | Poor |
| Comp. Ex. 7 | Ethylene-propylene-butene-1 copolymer b. (1.5 parts by wt.) c. (Silica, 0.35 part by wt.) | Polypropylene a. (2 μm, 0.02 part by wt.) | 0.13 | 0.01 | 2.1 | 135 | 0.97/0.88 | 5 | Poor |

TABLE 1-continued

| Examples and Comparative Examples | Construction of film and composition thereof | | Atomic construction ratio in surface portion of layer (B) | | Haze (%) | Gloss (%) | Friction coefficient static/dynamic | Al vacuum deposition adhesion index | Adaptability to vacuum deposition |
|---|---|---|---|---|---|---|---|---|---|
| | Laminated layer [layer (A)] | Base layer [layer (B)] | O/C | N/C | | | | | |
| Comp. Ex. 8 | Ethylene-propylene-butene-1 copolymer<br>a. (4.5 μm, 0.25 part by wt.)<br>c. (Silica, 0.35 part by wt.) | Polypropylene<br>a. (2 μm, 0.02 part by wt.) | 0.13 | 0.01 | 2.1 | 136 | 0.73/0.65 | 5 | Poor |

Note
(1) The additives are as described below.
a. a fine powder of a crosslinked silicone resin (average particle diameter in μm, amount incorporated)
b. a hydroxy-fatty acid glyceride (amount incorporated)
c. other additive (substance name, amount incorporated)

As apparent from the foregoing description, the propylene polymer film of the present invention has an excellent transparency, gloss, slipperiness and adhesiveness as well as a good adaptability to vacuum deposition.

We claim:

1. A propylene polymer film composed of a composition comprising:
   100 parts by weight of a propylene polymer,
   0.01 to 0.5 parts by weight of a fine powder of a crosslinked silicone resin, wherein the average particle diameter of the fine powder is from about 1.0 to 10.0 μm, and
   0.3 to 5.0 parts by weight of a hydroxy-fatty acid glyceride.

2. A propylene polymer film as set forth in claim 1, wherein the propylene polymer is at least one member selected from the group consisting of an ethylene/propylene copolymer, an ethylene/propylene/butene-1 copolymer and a propylene/butene-1 copolymer.

3. A propylene polymer film comprising a laminate film including at least one layer composed of a composition comprising 100 parts by weight of a propylene polymer, 0.1 to 0.6 parts by weight of a fine powder of a crosslinked silicone resin and 0.3 to 5.0 parts by weight of a hydroxy-fatty acid glyceride, and at least one layer composed of another composition comprising a propylene polymer.

4. A propylene polymer film as set forth in claim 3, wherein the propylene polymer in the composition comprising the crosslinked silicone resin powder and the hydroxy-fatty acid glyceride is at least one member selected from the group consisting of an ethylene/propylene copolymer, an ethylene/propylene/butene-1copolymer and a propylene/butene-1 copolymer.

5. A propylene polymer film having a laminate structure comprising:
   a layer (A) composed of a composition comprising 100 parts by weight of a propylene polymer, 0.01 to 0.5 parts by weight of a fine powder of a crosslinked silicone resin, wherein the average particle diameter of the fine powder is from about 1.0 to 10.0 μm, and 0.3 to 5.0 parts by weight of a hydroxy-fatty acid glyceride; and
   a layer (B) composed of a composition comprising 100 parts by weight a propylene polymer and 0.005 to 0.2 parts by weight of a fine powder of a crosslinked silicone resin, wherein the average particle diameter of the fine powder is from about 0.5 to 5.0 μm.

6. A propylene polymer film as set forth in claim 5, wherein the propylene polymer of the layer (A) is at least one member selected from the group consisting of an ethylene/propylene copolymer, an ethylene/propylene/butene-1 copolymer and a propylene/butene-1 copolymer.

7. A propylene polymer film as set forth in claim 5, wherein the propylene polymer of the layer (B) is a propylene homopolymer.

8. A propylene polymer film as set forth in claim 5, wherein the average particle diameter of the fine powder of the crosslinked silicone resin in the layer (A) is equal to or larger than the average particle diameter of the fine powder of the crosslinked silicone resin in the layer (B).

9. A propylene polymer film as set forth in claim 8, wherein the average particle diameter of the fine powder of the crosslinked silicone resin in the layer (A) is 1.0 to 10.0 μm and the average particle diameter of the fine powder of the crosslinked silicone resin in the layer (B) is 0.5 to 5.0 μm.

10. A propylene polymer film as set forth in claim 5, wherein the crosslinked silicone resin is polymethylsilsesquioxane and the hydroxy-fatty acid glyceride is glyceryl tri-12-1-hydroxystearate.

11. A propylene polymer film as set forth in claim 5, wherein the atomic construction ratio within 10 nm thickness of the outer surface layer on the side of the layer (B) is such that the oxygen atom number/carbon atom number ratio is in the range of from 0.10 to 0.35 and the nitrogen atom number/carbon atom number ratio is in the range of from 0.005 to 0.05.

12. A laminate film comprising a propylene polymer laminate film as set forth in claim 5 and vacuum-deposited metal layer formed on the outer surface side of the layer (B).

13. A propylene polymer film as set forth in claim 1, wherein the isotactic index (II) of the propylene polymer is at least 80.

14. A propylene polymer film as set forth in claim 1, wherein the propylene polymer is a propylene homopolymer having an isotactic index (II) of at least 95% and an intrinsic viscosity of from 1.2 to 2.5 dl/g.

15. A propylene polymer film as set forth in claim 1, wherein the fine powder of a crosslinked silicone resin is obtained by hydrolyzing and condensing a trifunctional silane in which the carbon number of each alkoxy group in the silane is 1 to 4.

16. A propylene polymer film as set forth in claim 1, wherein the hydroxy-fatty acid glyceride is a hydroxylated product of a mono-, di- or tri-glyceride of a fatty acid having 8 to 22 carbon atoms.

17. A propylene polymer film as set forth in claim 1, wherein the hydroxy-fatty acid glyceride includes a hydroxy substituent substituted for the hydrogen atom bonded to the twelfth carbon atom counted from the carbon atom of the carbonyl group.

18. A propylene polymer film as set forth in claim 1, wherein the hydroxy-fatty acid glyceride is a triglyceride.

19. A propylene polymer film as set forth in claim 1, wherein the hydroxy-fatty acid glyceride is glyceryl tri-12-hydroxystearate.

20. A propylene polymer film as set forth in claim 1, wherein the fine powder of the crosslinked silicone resin is present in an amount of from 0.02 to 0.35 parts by weight.

21. A propylene polymer film as set forth in claim 1, wherein the hydroxy-fatty acid glyceride is present in an amount of from 0.5 to 3.0 parts by weight.

22. A propylene polymer film as set forth in claim 5, wherein the hydroxy-fatty acid glyceride is a hydroxylated product of a mono-, di- or tri-glyceride of a fatty acid having 8 to 22 carbon atoms.

23. A propylene polymer film as set forth in claim 5, wherein the hydroxy-fatty acid glyceride includes a hydroxy substituent substituted for the hydrogen atom bonded to the twelfth carbon atom counted from the carbon atom of the carbonyl group.

24. A propylene polymer film as set forth in claim 5, wherein the hydroxy-fatty acid glyceride is a triglyceride.

25. A propylene polymer film as set forth in claim 5, wherein layer (B) is a base layer having a thickness of from 5 to 50 $\mu$m and layer (A) is an laminated layer having a thickness of from 0.5 to 20 $\mu$m.

26. A propylene polymer film as set forth in claim 5, wherein layer (B) is a base layer having a thickness of from 10 to °$\mu$m and layer (A) is a laminated layer having a thickness of from 1 to 10 $\mu$m.

* * * * *